United States Patent
Moritani

(10) Patent No.: US 8,029,016 B2
(45) Date of Patent: Oct. 4, 2011

(54) KNEE-PROTECTING AIRBAG DEVICE

(75) Inventor: Keisuke Moritani, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 12/739,034

(22) PCT Filed: Oct. 7, 2008

(86) PCT No.: PCT/JP2008/068242
§ 371 (c)(1),
(2), (4) Date: Apr. 21, 2010

(87) PCT Pub. No.: WO2009/054260
PCT Pub. Date: Apr. 30, 2009

(65) Prior Publication Data
US 2010/0253051 A1    Oct. 7, 2010

(30) Foreign Application Priority Data

Oct. 22, 2007    (JP) ................................ 2007-273477

(51) Int. Cl.
*B60R 21/16*    (2006.01)
(52) U.S. Cl. .................................... 280/730.1; 740/753
(58) Field of Classification Search ............... 280/730.1, 280/753, 740
See application file for complete search history.

(56) References Cited

U.S. PATENT DOCUMENTS

| | | |
|---|---|---|
| 2002/0171230 A1 | 11/2002 | Takimoto et al. |
| 2003/0120409 A1 | 6/2003 | Takimoto et al. |
| 2005/0057028 A1 | 3/2005 | Hayakawa |
| 2007/0090632 A1 | 4/2007 | Kashiwagi |

FOREIGN PATENT DOCUMENTS

| | | |
|---|---|---|
| JP | 2002-337649 A | 11/2002 |
| JP | 2003-175793 A | 6/2003 |
| JP | 2003-182504 A | 7/2003 |
| JP | 2004-330959 A | 11/2004 |
| JP | 2007-112371 A | 5/2007 |
| WO | 97/47497 A1 | 12/1997 |

*Primary Examiner* — Eric Culbreth
(74) *Attorney, Agent, or Firm* — Sughrue Mion, PLLC

(57) ABSTRACT

An airbag of a knee-protecting airbag device is prevented from being damaged during inflation and deployment, and the airbag is allowed to deploy evenly on the left and right sides to improve occupant protection function. The inside of an airbag (10) is defined into a plurality of air chambers (21), (22), and (23) by tethers (24) and (25). An inflator (2) accommodated in a diffuser (30) is disposed in the first air chamber (21). The diffuser (30) is provided with an opening (31) that allows gas from the inflator (2) to flow in the airbag (10) and is disposed so as to face the central portion of the first tether (24). This opening (31) is closed in such a manner that it can be opened by the gas from the inflator (2), and the entirety thereof is simultaneously opened by the gas pressure when the airbag (10) deploys. Thus, the gas in the accommodating portion (32) is supplied from the opening (31) to the airbag (10) evenly on the left and right sides. Furthermore, the diffuser (30) protects the airbag (10) from the gas generated by the inflator (2).

10 Claims, 4 Drawing Sheets

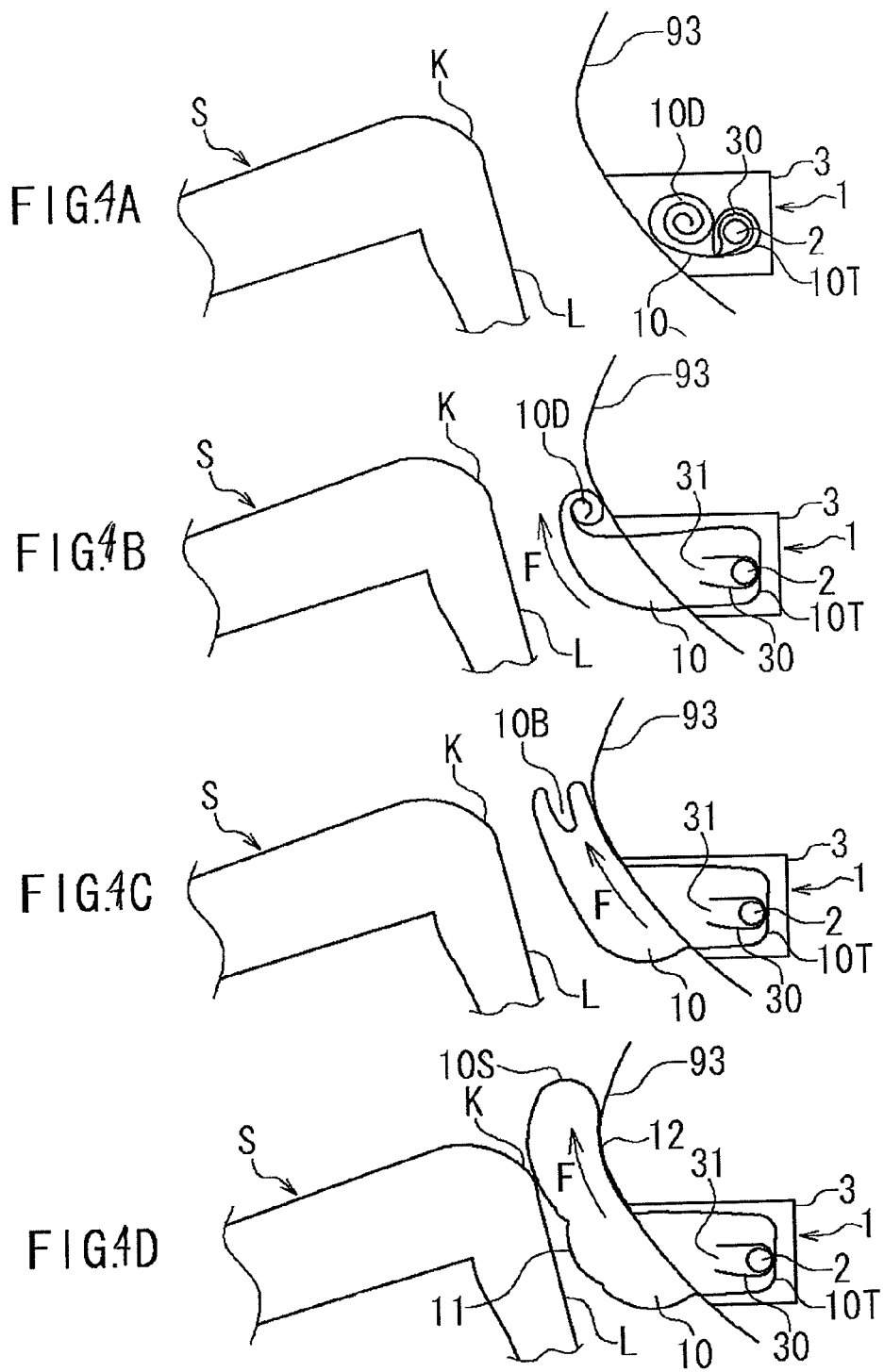

KNEE-PROTECTING AIRBAG DEVICE

CROSS REFERENCE TO RELATED APPLICATIONS

This application is a National Stage of International Application No. PCT/JP2008/068242 filed Oct. 7, 2008, claiming priority based on Japanese Patent Application No. 2007-273477, filed Oct. 22, 2007, the contents of all of which are incorporated herein by reference in their entirety.

TECHNICAL FIELD

The present invention relates to a knee-protecting airbag device installed in a vehicle, such as a car. The knee-protecting airbag device protects mainly the knees of an occupant in the vehicle using an airbag inflated and deployed by gas from an inflator.

BACKGROUND ART

There is widespread use of cars equipped with airbag devices for protecting occupants in the driver's seat and the passenger seat in a vehicle collision or in an emergency. The airbag devices are installed in, for example, the steering wheel and the instrument panel and have airbags that are inflatable and deployable. Furthermore, in recent years, knee-protecting airbag devices that can protect, at least, the knees of occupants are employed. In order to protect mainly the knees of the occupant, the airbag device is disposed in the vehicle body in front of the occupant, and the inflator is activated in a vehicle collision or in an emergency to inflate and deploy the airbag (a so-called knee bag or knee airbag) mainly between the vehicle body and the knees of the occupant.

This knee-protecting airbag device is disposed in, for example, a lower part of the instrument panel in front of the occupant. From there, in order to protect the occupant, the airbag is inflated and deployed toward a narrow space between the vehicle body and the occupant's legs up to the vicinity of the knees of the occupant before the knees of the occupant come into contact with the vehicle body. Therefore, knee-protecting airbag devices are required to have faster deployment characteristics; for example, the airbags need to deploy up to a height above the knees of the occupant within a short period of time (about 10ms (milliseconds)) after the airbag starts to inflate and deploy. At the same time, if the airbag exerts a force in directions spreading the knees of the occupant apart during inflation and deployment, the injury to the occupant would be significant, which is dangerous. Therefore, the airbag is also required to deploy evenly on the left and right sides, while preventing the occupant from coming into contact with the airbag deploying in a lateral direction.

In order to meet such a requirement, conventionally, a knee-protecting airbag device is known in which gas supplied from an inflator to the airbag is distributed to both sides in the lateral direction (the left-right direction) of the vehicle using a gas-flow distribution cloth to prevent the central portion of the airbag from inflating and deploying and to improve the inflation and deployment performances at ends in the left-right direction of the airbag, allowing the airbag to rapidly enter in front of the knees of the occupant (see Japanese Patent No. 3687602).

However, with this conventional knee-protecting airbag device, depending on the type of the inflator to be used or the manner in which the inflator is disposed in the airbag, the deployment characteristics of the airbag may decrease. That is, for example, a tubular inflator used in this airbag device usually has a gas discharge port at one end in the lengthwise direction. Therefore, if this inflator is disposed in such a manner that the center thereof is aligned with the center of the airbag in the lateral direction, the gas discharge port at one end is positioned so as to face an end of the gas-flow distribution cloth located off the center. As a result, the gas generated from the inflator may be supplied unevenly to one side in the airbag, making the deployment of the airbag uneven in the left and right directions. On the other hand, in order to counter this, if the inflator is disposed so as to be shifted in the lateral direction in the airbag to make the gas discharge port be aligned with the center of the airbag, the disposition thereof in the airbag becomes difficult. This makes it difficult to assemble the inflator with the airbag, decreasing the working efficiency in the assembling. Furthermore, in this case, a problem of decrease in the balance of the airbag device in the left-right direction occurs.

In addition, in this conventional knee-protecting airbag device, because the gas generated by the inflator is directly blown against the gas-flow distribution cloth and the airbag, the heat may make a hole and damage the gas-flow distribution cloth and the airbag. Similarly, in this airbag device, because the gas discharge port of the inflator is directly in contact with the airbag, the airbag, including the internal members, may be more likely to be damaged during inflation and deployment; for example, the heat generated by the gas generation in the vicinity thereof may make a hole in the airbag.

[Patent Document 1] Japanese Patent No. 3687602

DISCLOSURE OF INVENTION

Problems to be Solved by the Invention

The present invention has been made in view of the above-described conventional problems, and objects thereof are to prevent a decrease in working efficiency in the assembling of a knee-protecting airbag device and a decrease in the balance thereof, to reduce the damage to the airbag during inflation and deployment, and to deploy the airbag evenly on the left and right sides to improve the occupant protection function.

Means for Solving the Problems

A first aspect of the invention is a knee-protecting airbag device including: an airbag with a base end attached to and accommodated in a vehicle body in front of an occupant; and an inflator that supplies gas to the airbag from a gas discharge port, the knee-protecting airbag device inflating and deploying the airbag from the base end to a position between the vehicle body and the knees of the occupant with the gas from the inflator. The knee-protecting airbag device includes: a diffuser accommodating the inflator and disposed in the airbag, the diffuser having an opening that allows the gas from the inflator to flow in the airbag; and at least one tether disposed in the airbag so as to face the opening of the diffuser, the tether defining the inside of the airbag in a deploying direction. The opening of the diffuser is closed before the inflator is activated and is opened by the gas from the inflator when the airbag deploys.

A second aspect of the invention is the knee-protecting airbag device according to the first aspect, in which the diffuser is disposed in the airbag such that a portion other than the opening is disposed between the gas discharge port of the inflator and the tether facing thereto.

A third aspect of the invention is the knee-protecting airbag device according to the first or second aspect, in which the diffuser is formed by joining folded base fabric sheets together so as to be capable of accommodating the inflator therebetween and so as to leave the opening.

A fourth aspect of the invention is the knee-protecting airbag device according to any one of the first to third aspects, in which the tether is provided with a through-hole that allows the gas from the inflator to circulate.

A fifth aspect of the invention is the knee-protecting airbag device according to any one of the first to fourth aspects, in which the diffuser is formed such that an accommodating portion that accommodates the inflator is gradually reduced in size toward the opening, at least on the opening side.

A sixth aspect of the invention is the knee-protecting airbag device according to any one of the first to fifth aspects, in which the diffuser accommodating the inflator, whose opening is closed, is disposed in the airbag.

A seventh aspect of the invention is the knee-protecting airbag device according to any one of the first to fifth aspects, in which the diffuser accommodating the inflator, whose opening not closed, is disposed in the airbag, and the opening is closed when the airbag is folded.

Advantages

According to the present invention, it is possible to prevent a decrease in working efficiency in the assembling of the knee-protecting airbag device and a decrease in the balance thereof, to reduce the damage to the airbag during inflation and deployment, and to deploy the airbag evenly on the left and right sides to improve the occupant protection function.

BRIEF DESCRIPTION OF DRAWINGS

FIG. 4 is a schematic view sequentially showing the respective states in which the airbag of the airbag device according to this embodiment is inflated and deployed.

REFERENCE NUMERALS

1: airbag device, 2: inflator, 2A: gas discharge port, 3: case, 10: airbag, 10B: folding-in portion, 10C: lateral roll-folded portion, 10D: longitudinal roll-folded portion, 10S: leading end, 10T: base end, 11: occupant-side base fabric sheet, 12: vehicle-body-side base fabric sheet, 21: first air chamber, 22: second air chamber, 23: third air chamber, 24: first tether, 24A: gas passages, 24B: through-hole, 25: second tether, 25A: gas passages, 25B: through-hole, 26: third tether, 30: diffuser, 31: opening, 32: accommodating portion, 33: joined portion, 34: inclined joined portion, 90: vehicle, 91: steering wheel, 92: shaft, 93: instrument panel, F: airbag deploying direction, S: occupant, K: knee, and L: shin.

BEST MODE FOR CARRYING OUT THE INVENTION

An airbag device according to an embodiment of the present invention will be described below with reference to the drawings.

This airbag device is a knee-protecting airbag device (hereinafter simply, an "airbag device") disposed in front of an occupant in a vehicle, such as an occupant seated in the driver's seat or passenger seat of a car, and can protect the knees of the occupant. Furthermore, this airbag device not only protects the knees, but also restrains the lumbar of the occupant from moving forward to serve to enhance the effect of seat belts. In this embodiment, a description will be given below taking an airbag device disposed in the instrument panel located in front of the driver's seat of a vehicle as an example.

Figure 1:
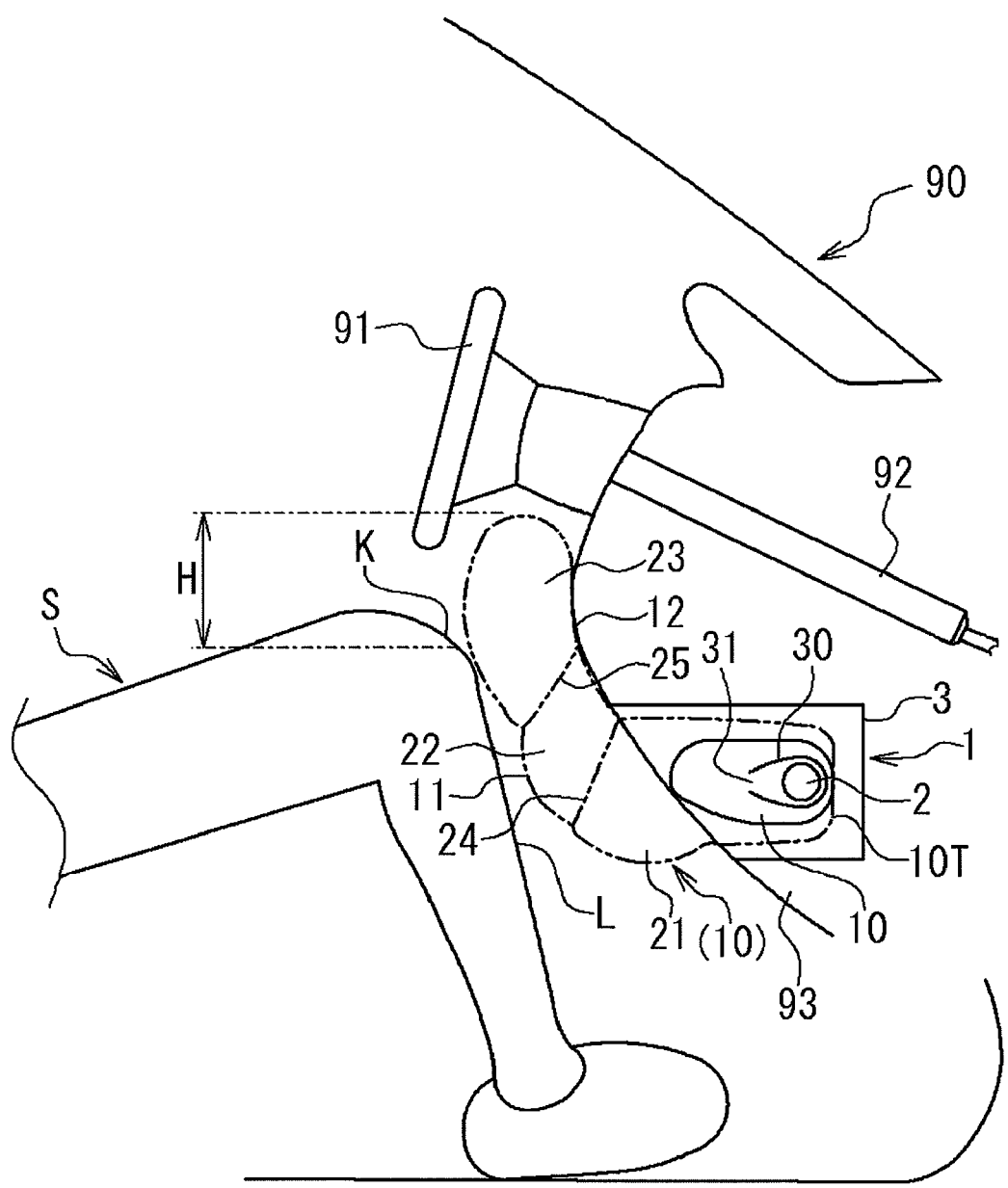
FIG. 1 is a schematic view of a relevant part showing an airbag device according to this embodiment installed in a vehicle.

FIG. 1 is a schematic view of a relevant part showing the airbag device according to this embodiment installed in a vehicle. Mainly, the configuration viewed from a side (in the lateral direction of the vehicle) is schematically shown in cross section. A two-dot chain line in the figure schematically shows a state in which an airbag 10 of an airbag device 1 is inflated and deployed in a vehicle 90. The driver's seat of the vehicle 90 and the vicinity thereof where the airbag device 1 is installed, mainly on a steering wheel 91 side, are also schematically shown partially in cross section, viewed in the lateral direction of the vehicle.

Note that this vehicle 90 is a standard passenger car and, as shown in the figure, includes a steering wheel 91 disposed in front of an occupant S (only the legs are shown), an instrument panel 93 disposed in front of the occupant S so as to cover a shaft 92 connected to the steering wheel 91, and the like. The vehicle 90 also includes the airbag device 1 in the instrument panel 93 positioned below the steering wheel 91, and the airbag device 1 is disposed at a predetermined position on the front side of the occupant S.

The airbag device 1 includes the airbag 10 that is inflatable and deployable, an inflator 2 that generates gas upon detection of a predetermined impact and supplies the gas to the airbag 10, a diffuser 30 that accommodates the inflator 2, and a case 3 that accommodates the airbag 10 before being inflated, the inflator 2, the diffuser 30, etc. Furthermore, this airbag device 1 has a known configuration in which, for example, the case 3 is disposed in the instrument panel 93 on the front side of the vehicle (the right side in the figure) and is attached to a position below knees K of the seated occupant S (herein, a position opposed to shins L), and, in a non-operating state, an opening in the case 3 on the occupant S side is covered by an airbag cover (not shown) that is split by the airbag 10 being inflated and deployed.

The inflator 2 is a cylinder-type gas generating device having a substantially tubular shape (the figure shows a cross section viewed in the lengthwise direction) and generates gas and supplies the gas to the airbag 10 from a gas discharge port (not shown) provided at one end thereof in the lengthwise direction. Furthermore, herein, the inflator 2 is entirely covered by the substantially bag-like diffuser 30 having an opening 31. In this state, the inflator 2 is disposed in the airbag 10 and is fixed in the case 3 through fixing means including bolts, nuts, and attaching members (not shown) so as to sandwich one end (a base end 10T) of the airbag 10 and the diffuser 30, together with them. Thus, the inflator 2 attaches and fixes the base end 10T of the airbag 10 to the case 3 in an airtight manner and, in a vehicle emergency or the like, supplies gas to the airbag 10 from the opening 31 of the diffuser 30 facing toward the inside of the airbag 10.

The case 3 is a container that integrally accommodates the airbag 10 and the inflator 2 in a normal state before the airbag device 1 and the inflator 2 are activated. The case 3 is formed into a substantially box shape from, for example, a metal plate and accommodates the airbag 10 in a predetermined state, i.e., a state of being folded in an inflatable and deployable manner. Furthermore, as described above, the case 3 is fixed in the instrument panel 93 and securely holds the base end 10T of the airbag 10 fixed to the inside by the inflator 2 at the same position even in an activation of the airbag device 1 (in the inflation and deployment of the airbag 10). With this case 3, the airbag 10 before inflation and deployment is accommodated on the vehicle-body side in front of the knees K of the seated occupant S (herein, to the instrument panel 93) with the base end 10T attached.

The airbag 10 has a substantially bag shape having a size corresponding to the area to be protected, for example, the knees K of the occupant S, and has one or a plurality of (herein, two) tethers 24 and 25 provided between the inside surfaces thereof on the occupant S side and the vehicle-body side (instrument panel 93 side). The plurality of tethers 24 and 25 serve as restraining members that restrain the inflation of the airbag 10 in the thickness direction to maintain the distance between the surfaces at a predetermined distance. The tethers 24 and 25 also serve as partition walls that divide (define) the inside of the airbag 10, and they define the inside of the airbag 10 into two or more (herein, three) air chambers 21, 22, and 23 provided on both sides thereof.

In this embodiment, the first tether 24 on the base end 10T side and the second tether 25 on the occupant S side divide the inside of the airbag 10, from the base end 10T side to the other end side (leading end side), into a first air chamber 21 and a second air chamber 22 that mainly receive the shins L side of the occupant S and a third air chamber 23 that mainly receives the knees K of the occupant S. Furthermore, during inflation and deployment, the airbag 10 deploys from the base end 10T side toward the space between the instrument panel 93 and the knees K of the occupant S, while sequentially inflating the air chambers 21, 22, and 23 (in the present invention, the direction in which the airbag 10 deploys is referred to as a "deploying direction").

This airbag 10 is formed in a substantially bag shape by, for example, layering two base fabric sheets of the same shape, formed by cutting woven fabric, on top of each other, or, by folding a base fabric sheet having a symmetrical shape and then sewing them together along the peripheral portion, that is, by joining opposed base fabric sheets at a predetermined position in an airtight manner so as to form inflatable air chambers therebetween. In this embodiment, the airbag 10 is formed of an occupant-side base fabric sheet 11 on the occupant S side and a vehicle-body-side base fabric sheet 12 on the instrument panel 93 side having the same shape. The opposed base fabric sheets 11 and 12 are laid on top of each other and sewn together along the outer peripheral edges to form the airbag 10.

Figure 2:
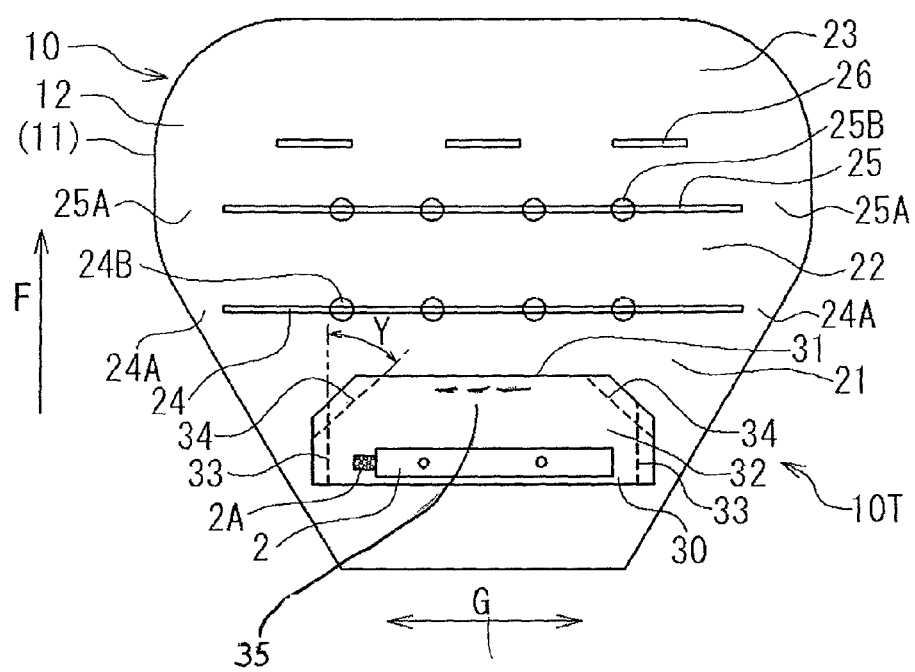
FIG. 2 is a plan view schematically showing an airbag according to this embodiment.

FIG. 2 is a plan view schematically showing the thus-formed airbag 10 and is a deployed plan view showing, in outline, the shape and configuration of the airbag 10 in a deployed state, viewed from the vehicle body (instrument panel 93) side. The figure also shows the inner configuration of the airbag 10 in a see-through view showing the inside.

As shown in the figure, the airbag 10 is formed such that the width of the vehicle-body-side base fabric sheet 12 and the occupant-side base fabric sheet 11 (positioned on the far side with respect to the plane of the sheet) opposed to each other is large at the leading end side in the deploying direction (arrow F in the figure) and is gradually reduced toward the base end 10T, and such that both sides in the left-right direction (arrow G in the figure), substantially perpendicular to the deploying direction F, are substantially symmetrical with respect to the center line of the airbag 10.

In the airbag 10, the above-described two tethers 24 and 25 are disposed so as to extend in a direction intersecting the deploying direction F and are joined to the opposed surfaces of the base fabric sheets 11 and 12 by sewing over substantially the entirety thereof in the lengthwise direction. Thus, the tethers 24 and 25 function as the partition walls having a predetermined length in the front-rear direction of the vehicle in the airbag 10 and divide the inside of the airbag 10 in the deploying direction F to form three air chambers 21, 22, and 23. Furthermore, herein, the tethers 24 and 25 have a ribbon shape of a predetermined width and extend substantially in parallel to each other in the left-right direction G perpendicular to the deploying direction F. The ends of the tethers 24 and 25 in the lengthwise direction are not joined to the base fabric sheets 11 and 12 at both ends of the airbag 10 in the left-right direction G, so as to provide gas passages (spaces) 24A and 25A therebetween.

In addition, the tethers 24 and 25 have a gas circulation (flow-in) structure that allows the adjacent air chambers 21, 22, and 23 to communicate with one another, which is formed by, for example, providing one or a plurality of through-holes from the central portion and the vicinity thereof to both edges in the left-right direction G or by forming the tethers 24 and 25 from a plurality of segments arranged to leave gaps or notches therebetween. This gas circulation structure constitutes a gas-flowable portion that allows the gas from the inflator 2 to circulate (flow-in) through the air chambers 21, 22, and 23 defined by the tethers 24 and 25 and formed on both sides thereof. Herein, the gas circulation structure is formed of a plurality of through-holes 24B and 25B. That is, the tethers 24 and 25 each have a plurality of (herein, four) through-holes 24B and 25B (schematically shown as circular holes in the figure) that are provided substantially symmetrical on the left and right sides with respect to the center line of the airbag 10, substantially evenly at equal intervals in the left-right direction G. The gas is circulated through these through-holes 24B and 25B.

On the other hand, the air chambers 21, 22, and 23 in the airbag 10 are defined by the tethers 24 and 25 and extend in the left-right direction G perpendicular to the deploying direction F of the airbag 10. When inflated, the air chambers 21, 22, and 23 have substantially tubular shapes whose thicknesses and widths correspond to the widths, disposing distances, etc., of the tethers 24 and 25. Furthermore, the adjacent ones of the air chambers 21, 22, and 23 with the tethers 24 and 25 therebetween communicate with each other through the gas passages 24A and 25A at both ends and the through-holes 24B and 25B, and they are inflated and deployed by the gas supplied and circulated therethrough.

Moreover, in the third air chamber 23 on the leading end side in the deploying direction F, a plurality of (herein, three) third tethers 26 are joined to predetermined positions of the opposed base fabric sheets 11 and 12 by sewing or the like. These third tethers 26 are, for example, substantially rectangular or strip-shaped base fabric sheets for restraining the inflation of the third air chamber 23 in the thickness direction, and they are arranged at predetermined positions in the third air chamber 23 in the deploying direction F (herein, positions close to the second tether 25 located at substantially the center) at substantially equal intervals in the left-right direction G. On the other hand, in the first air chamber 21 on the base end 10T side, the inflator 2 covered by the above-described diffuser 30 is disposed in such a manner that the lengthwise direction thereof is substantially perpendicular to the deploying direction F of the airbag 10.

Herein, the diffuser 30 serves as a rectifying member that rectifies the gas from the inflator 2 and supplies the gas to the airbag 10, as well as a protection member (protection cloth) that protects the airbag 10 from the gas generated from the inflator 2 and the gas discharge port 2A at one end thereof. That is, the diffuser 30 with the inflator 2 accommodated in an internal accommodating portion 32 is disposed on the base end 10T side of the airbag 10, mainly between the inflator 2 and the base fabric sheets 11 and 12. Thus, the diffuser 30 prevents the gas generated by the inflator 2 from directly blowing against the base fabric sheets 11 and 12, the first tether 24, and the like and prevents the gas discharge port 2A from coming into direct contact with the airbag 10 to protect the airbag 10 and reduce the damages thereto. Furthermore, the diffuser 30 has the above-described opening 31 that communicates with the accommodating portion 32 and allows the gas from the inflator 2 to flow into the airbag 10. This opening 31 is disposed so as to face the central portion of the first tether 24, thereby rectifying the gas from the inflator 2 by the opening 31 and supplying it to the first tether 24 facing thereto.

In this embodiment, this diffuser 30 is formed by, for example, folding and layering one or a plurality of base fabric sheets and joining both sides of the folded base fabric sheet together with the fold therebetween, such that the folded base fabric sheet is joined, excepting the opening 31, so as to be capable of accommodating the inflator 2 between the base fabric sheets. More specifically, herein, the diffuser 30 is formed in a substantially bag shape by folding a piece of substantially rectangular base fabric sheet in half at the center so as to have a substantially rectangular shape and joining openings at left and right ends layered on each other by sewing so as to form the accommodating portion 32 capable of accommodating the inflator 2 between the base fabric sheets. At this time, the base fabric sheet is sewn along the edge except for the opening 31 so as to leave one portion open. Then, joined portions 33 and 34 are formed on both right and left sides symmetrically, and the accommodating portion 32 and the inside of the airbag 10 are allowed to communicate with each other through the opening 31. Then, the opening 31 is disposed so as to face the deploying direction F (upper side in the figure) in the airbag 10.

Furthermore, in the diffuser 30, the joined portions 33 and 34 on the left and right sides are formed so as to extend in different directions with a substantially central portion in the deploying direction F therebetween, and the joined portions 33 on the base end side, accommodating the inflator 2, extend in the deploying direction F. On the other hand, the joined portions 34 on the opening 31 side are formed obliquely at a predetermined angle with respect to the deploying direction F (herein, substantially) 45° (angle Y in the figure) in directions gradually approaching each other toward the opening 31 (hereinafter referred to as the "inclined joined portions 34"), such that the substantially bag-shaped accommodating portion 32 is reduced in size at the opening 31. Thus, in the diffuser 30, the internal accommodating portion 32 that accommodates the inflator 2 is gradually reduced in size toward the opening 31 at least on the opening 31 side, and the opening 31 positioned at the tip of the diffuser is disposed so as to face the central portion of the opposed first tether 24.

To the thus-formed diffuser 30, the inflator 2 is inserted from the opening 31, and the entirety thereof is accommodated on the base end side of the accommodating portion 32. The gas discharge port 2A at one end thereof is disposed in a region in the inclined joined portion 34 being located at one end of the diffuser 30 (the left side in the figure) and outside of the opening 31 in the left-right direction. As a result, the diffuser 30 is disposed in the airbag 10 such that a portion other than the opening 31 (herein, the inclined joined portions 34 in the vicinity of the opening 31) is disposed between the gas discharge port 2A of the inflator 2 and the first tether 24 facing thereto and positioned in the gas-discharging direction. Accordingly, in this airbag device 1, the gas discharged from the gas discharge port 2A of the inflator 2 does not directly hit the first tether 24, but passes from the inside of the accommodating portion 32 through the opening 31 and is rectified toward the first tether 24, and then is supplied to the airbag 10 through these portions.

In addition to the above, in this embodiment, the opening 31 of the diffuser 30 is closed before the activation (gas generation) of the inflator 2 and is opened by receiving the gas pressure of the gas from the inflator 2 when the airbag 10 deploys upon the activation of the airbag device 1 and inflator 2. This opening 31 is closed in such a manner that it can be opened by the gas from the inflator 2 by, for example, folding the entirety of the vicinity of the opening 31 of the diffuser 30 at least once toward the inflator 2 when it is assembled to the airbag 10, or by joining the opening 31 with a an adhesive or by sewing the opening 31 with a reduced sewing strength schematically shown at 35.

Thus, the opening 31 of the diffuser 30 is kept closed until the inflator 2 is activated. Once the inflator 2 is activated, the gas is supplied and temporarily fills the accommodating portion 32 whose opening 31 is closed, increasing the internal gas pressure. An increase in the gas pressure causes substantially uniform pressure (internal pressure) to act on the entirety of the opening 31. As a result, the entirety of the closed opening 31 is substantially simultaneously opened at a predetermined pressure, whereby the accommodating portion 32 is released in the airbag 10 and communication therebetween is established. In this manner, the airbag device 1 simultaneously opens the entirety of the opening 31 to discharge the gas in the accommodating portion 32 uniformly in the vehicle width direction (left-right direction G) from the entirety of the opening 31 toward the central portion of the opposed first tether 24 and rectifies and supplies the gas from the inflator 2 to the airbag 10 evenly on the left and right sides through the opening 31.

As has been described, in the airbag device 1 according to this embodiment, the inflator 2 and the diffuser 30 are disposed in the first air chamber 21, and, in a vehicle emergency or the like, gas generated from the gas discharge port 2A of the inflator 2 is supplied into the first air chamber 21 through the opening 31 in the diffuser 30. The gas is allowed to circulate through the gas passages 24A and 25A and the through-holes 24B and 25B toward the second air chamber 22 and the third air chamber 23 to inflate these air chambers and to deploy the airbag 10 in the deploying direction F. Thus, the airbag device 1 (see FIG. 1) deploys the airbag 10 from the base end 10T attached in front of the occupant S upward in the vehicle height direction along the instrument panel 93 and inflates and deploys the airbag 10 between the vehicle body and at least the knees K of the occupant S (herein, from the shins L to above the knees K). In this manner, the airbag 10 is inflated and deployed mainly between the vehicle body and the knees K of the occupant S to proGtect at least the knees K of the occupant S with this airbag 10. Thus, mainly the knees of the occupant S seated in the vehicle are protected.

Although a non-coated base fabric sheet, which is not coated, may be used for the base fabric sheets 11 and 12, the diffuser 30, and the like that constitute the airbag 10, a base fabric sheet having an airtight resin layer made of, for example, silicone rubber or silicone resin may be used, from the standpoint of airtightness. Furthermore, in this airbag device 1, the deploying length of the airbag 10 is set such that the third air chamber 23 provided at the extreme leading end of the airbag 10 in the deploying direction F comes into contact with the vicinity of the knees K of the occupant S, and such that the leading end of the airbag 10 can cover up to the region 50 mm above the height of the knees of the occupant S (area H in FIG. 1). Moreover, herein, in order to increase the speed at which the airbag 10 is inflated and deployed to quickly deploy the airbag 10 to a predetermined height above the knees of the occupant S, the airbag 10 is folded according to a predetermined process; for example, the leading end of the airbag 10 is folded into the airbag 10, and is accommodated in the case 3.

FIG. 3 is a schematic view sequentially showing the steps of folding the airbag 10. FIG. 3 contains plan views corresponding to the above-described FIG. 2 and schematically showing various states of the airbag 10 viewed from the vehicle body (instrument panel 93) side. Note that FIG. 3D schematically shows a cross section taken along line 3D-3D in FIG. 3C.

In this embodiment, as shown in the figure, the inflator 2 accommodated in the above-described diffuser 30 (not shown in FIG. 3) is preliminarily disposed at a predetermined position in the first air chamber 21 in the airbag 10, and the airbag 10 is folded. Then, they are integrally accommodated in the case 3. At this time, the airbag 10 is folded through folding steps (process) mainly consisting of a first step in which a leading end 10S in the deploying direction F is folded; a second step in which ends (left and right ends) 10M in the left-right direction G perpendicular to the deploying direction F of the airbag 10 after the first step are roll-folded in the lateral direction; and a third step in which the airbag 10 after the second step is roll-folded in the longitudinal direction toward the base end 10T.

Figure 3A:
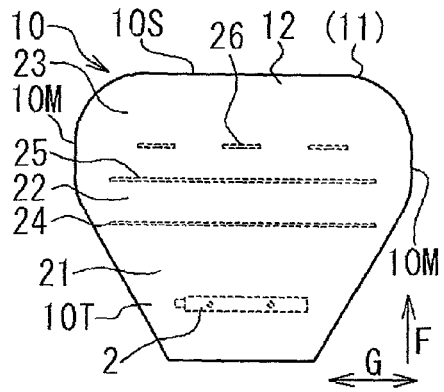
FIG. 3 is a schematic view sequentially showing the steps of folding the airbag according to this embodiment.
Figure 3E:
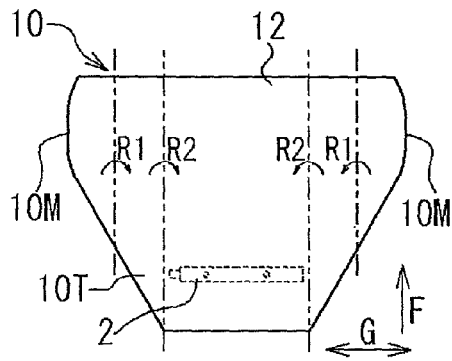
Figure 3B:
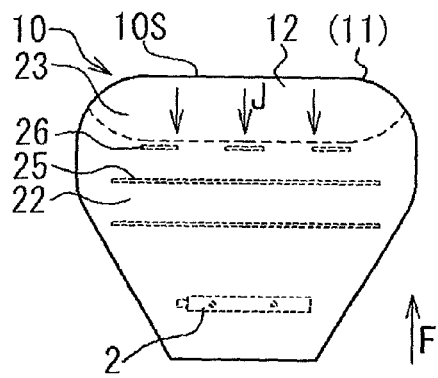
Figure 3F:
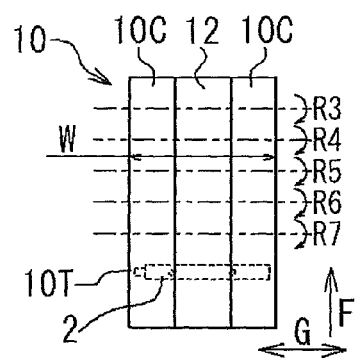

More specifically, in the first step, from a state in which the base fabric sheets 11 and 12 of the airbag 10 are laid flat on top of each other (see FIG. 3A), the leading end 10S in the deploying direction F during inflation and deployment is folded so as to be tucked into the airbag 10 (arrows J in FIG. 3B). At this time, the surface of the airbag 10 at the leading end 10S (see FIG. 3C) is tucked into the airbag 10 from the upper edge toward the base end 10T of the airbag 10 so as to be reversed to the inside. Thus, the base fabric sheets 11 and 12 are folded (see FIG. 3D) to form a folding-in portion 10B. Furthermore, in the first step, the leading end 10S of the airbag 10 is folded into the third air chamber 23 and is folded to the position of the plurality of third tethers 26 in the third air chamber 23 so as to be abutted thereagainst.

Figures 3C, 3D:
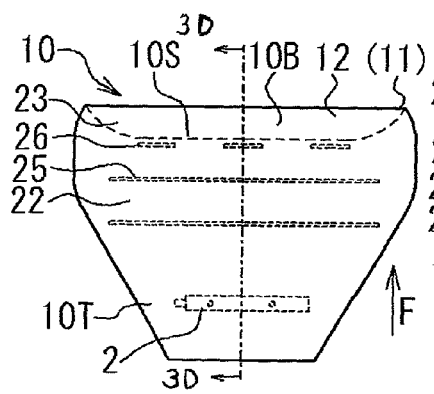
Figure 3G:
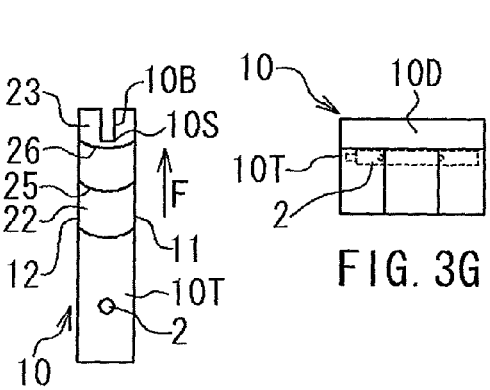

Although FIG. 3D schematically shows a folded state of the leading end 10S such that gaps are provided between the members, such as the base fabric sheets 11 and 12, these members are actually disposed so as to overlie each other. Furthermore, the third tethers 26 are pushed toward the second tether 25 by the leading end 10S and are folded and layered at the substantially central position.

Next, in the second step, the left and right ends 10M of the airbag 10 (see FIG. 3E) after the first step are folded toward each other so as to be wrapped around the surface on the vehicle-body side, thereby roll-folding the respective predetermined areas in the lateral direction. At this time, in the second step, the left and right ends 10M of the airbag 10 are roll-folded with the vehicle-body-side base fabric sheet 12 inside, from the outside toward the center of the airbag 10 in the left-right direction G, by folding and sequentially rolling them toward the vehicle-body-side base fabric sheet 12 on the instrument panel 93 side a predetermined number of times (arrows R1 and R2 in FIG. 3E).

Thus, the left and right ends 10M of the airbag 10 are roll-folded to the length of the inflator 2 and the width of the above-described accommodating portion of the case 3, forming lateral roll-folded portions 10C having a predetermined width on both sides of the airbag 10 in the lateral direction (see FIG. 3F) and making a folding width W in the left-right direction G substantially the same as the length of the inflator 2. Furthermore, herein, the left and right ends 10M roll-folded in the second step are disposed with a predetermined distance therebetween so that the opposed portions at the center of the airbag 10 do not come into contact with each other; that is, the airbag 10 has a non-roll-folded portion between the lateral roll-folded portions 10C.

Next, in the third step, the leading end of the airbag 10 in the deploying direction F after the second step is folded toward the base end 10T so as to be wrapped around the surface on the vehicle-body side, thereby roll-folding a predetermined area in the longitudinal direction. At this time, in the third step, the airbag 10 after the lateral roll-folded portions 10C are formed is folded and sequentially rolled toward the vehicle-body-side base fabric sheet 12 a predetermined number of times, from the leading end side in the deploying direction F toward the base end 10T and the inflator 2 (arrows R3 to R7 in FIG. 3F). Thus, the airbag 10 is roll-folded to a predetermined width with the lateral roll-folded portions 10C and the vehicle-body-side base fabric sheet 12 inside, forming a longitudinal roll-folded portion 10D next to a portion where the inflator 2 is disposed (see FIG. 3G).

Herein, the diffuser 30 may be disposed in the airbag 10 before the airbag 10 is folded, after the inflator 2 inserted from the opening 31 is accommodated in the accommodating portion 32 and the opening 31 (see FIG. 2) is closed. Alternatively, the opening 31 may not be closed in advance but may be closed at the same time when the airbag 10 is folded. That is, when the opening 31 is closed in advance, the diffuser 30, which accommodates the inflator 2 and whose opening 31 is closed with an adhesive, by sewing, by folding, or the like, is disposed in the airbag 10 and is assembled thereto. Then, the airbag 10 is folded.

In contrast, when the opening 31 is not closed in advance, the diffuser 30, which accommodates the inflator 2 and whose opening 31 is not closed, i.e., the opening 31 is partially or entirely open, is disposed in the airbag 10. Then, when the airbag 10 is folded, the opening 31 is closed such that the entirety of the opening 31 is folded and closed together with the airbag 10 being folded, and, keeping this state, the diffuser 30 is assembled to the airbag 10. Herein, the opening 31 of the diffuser 30 is closed simultaneously with folding of the airbag 10, and the opening 31 side of the diffuser 30 is closed in the above-described third step of folding (see FIG. 3F). At this time, a portion including the opening 31 of the deployed diffuser 30 is disposed beyond a part of the folded portion of the airbag 10 that is roll-folded in the longitudinal direction (for example, the folded part indicated by arrows R7 or R6 in FIG. 3F) (see FIG. 2), and the entirety on the opening 31 side is folded at least once, together with the airbag 10 folded at that position. Thus, the opening 31 is closed.

The airbag 10 folded through the above-described process is then accommodated in the case 3 (see FIG. 1) together with the inflator 2, diffuser 30, and the like. Then, as described above, the base end 10T is fixed to the case 3 by the inflator 2 or the like, with the diffuser 30 therebetween. Thus, the airbag device 1 is manufactured. Thereafter, the airbag device 1 is installed in the instrument panel 93 of a vehicle and, in a vehicle emergency or the like, activates the inflator 2 and supplies gas to the airbag 10 sequentially through the opening 31 of the diffuser 30, the through-holes 24B and 25B of the tethers 24 and 25, and the gas passages 24A and 25A on both sides. Thus, the airbag 10 is inflated and deployed from the base end 10T, which is attached to the vehicle-body, toward the leading end 10S and in the left-right direction etc., while eliminating the folded shape.

FIG. 4 is a schematic view sequentially showing the respective states in which the airbag 10 of the airbag device 1 is inflated and deployed. FIG. 4 shows the airbag device 1 and the knees K of the occupant S and the vicinity thereof, extracted from FIG. 1.

As shown in FIG. 4A, the airbag 10 before inflation and deployment is disposed in the case 3 together with the inflator 2 etc., with the longitudinal roll-folded portion 10D formed in the above-described third step oriented upward and is accommodated on the vehicle-body side in a state of being roll-folded toward the vehicle body (instrument panel 93) side with respect to the occupant S side. From this state, during inflation and deployment, the airbag 10 begins to deploy from the base end 10T on the vehicle-body side and projects from the inside of the case 3 and instrument panel 93 toward the occupant S on the rear side of the vehicle.

During this inflation and deployment, first, as described above, the gas from the inflator 2 opens the closed opening 31 of the diffuser 30. Then, the internal gas is discharged from the entirety of the opening 31 (see FIG. 2) toward the first tether 24 substantially evenly on the left and right sides and is supplied into the first air chamber 21. More specifically, herein, as the gas pressure in the diffuser 30 (accommodating portion 32) increases, the diffuser 30 inflates. This unfolds the airbag 10 in contact therewith, unfolding the folding in the vicinity of the opening 31 and opening (releasing) the opening 31.

As shown in FIG. 4B, first, the airbag 10 sequentially deploys mainly in the vehicle height direction due to the gas supplied from the inflator 2, until the longitudinal roll-folded portion 10D formed in the third step (see FIGS. 3F and 3G) is unfolded in a direction opposite to the rolled direction and the roll-folded portion is unfolded. At this time, because the airbag 10 of the airbag device 1 is roll-folded toward the instrument panel 93, it deploys closely along the outer surface of the instrument panel 93 on the occupant S side, to about the height of the knees K of the occupant S (see FIG. 4C).

Next, the lateral roll-folded portions 10C of the airbag 10 (see FIGS. 3E and 3F) formed in the second step are unfolded in the directions opposite to the rolled directions and deploy mainly outward of the airbag 10 in the left-right direction G. At this time, because the lateral roll-folded portions 10C to be deployed are roll-folded toward the instrument panel 93, similarly to the above-described longitudinal roll-folded portion 10D, they extend toward both left and right ends and deploy along the outer surface of the instrument panel 93, on a side of the airbag 10 opposite to the occupant S. Note that, depending on the folded state of the airbag 10, the lateral roll-folded portions 10C may begin to deploy upon, for example, completion of the deployment of the longitudinal roll-folded portion 10D or may deploy sequentially from portions where the longitudinal roll-folded portion 10D has deployed, simultaneously with the deployment.

Furthermore, with the deployment of the lateral roll-folded portions 10C, the folding-in portion 10B formed in the first step (see FIGS. 3B and 3C) is released from the restraint by the lateral roll-folded portions 10C, and an area thereof positioned in a region inflated by the gas gradually increases. As a result, the folding-in portion 10B inside the airbag 10 (see FIG. 4C) receives the gas pressure and begins to deploy. Then, it gradually extends outside the airbag 10 in conjunction with the deployment of the lateral roll-folded portions 10C (see FIG. 4D) and completes the deployment substantially simultaneously with the completion of the deployment of the lateral roll-folded portions 10C. At this time, the folding-in portion 10B at the leading end 10S is not affected by the friction with the knees K or the instrument panel 93 because it is positioned inside the airbag 10. Furthermore, even if the folding-in portion 10B is sandwiched between the occupant S and the instrument panel 93, it passes therebetween and reliably deploys.

In the above-described manner, the airbag 10 inflates and deploys to a predetermined height above the knees from the base end 10T side to a position between the instrument panel 93 and the knees K of the occupant S, and mainly the knees K of the occupant S moving toward the front side of the vehicle come into contact with the occupant-side base fabric sheet 11. As a result, the opposite side of the airbag 10, i.e., the vehicle-body-side base fabric sheet 12, is pressed against the outer surface of the instrument panel 93, and, as described above, the air chambers 21, 22, and 23 in the airbag 10 (see FIG. 1) receive the knees K of the occupant S and the like. Thus, mainly the knees K of the occupant S are protected.

As has been described above, in the airbag device 1 according to this embodiment, during inflation and deployment, the entirety of the closed opening 31 of the diffuser 30 is substantially simultaneously opened by the gas from the inflator 2, and the gas filling the accommodating portion 32 is supplied from the entirety of the opening 31 toward the first tether 24. Therefore, the gas from the inflator 2 can be substantially evenly discharged at the entirety of a portion of the first tether 24 opposed to the opening 31 and can be allowed to flow in the first air chamber 21 substantially evenly in the left-right direction G. In accordance with this, it is possible to prevent the gas from being unevenly supplied to the airbag 10, to distribute the gas in the left-right direction G with the first tether 24, and to rectify and evenly supply the gas to the airbag 10 in the left and right directions.

As a result, the airbag 10 can be deployed evenly on the left and right sides toward the left and right ends 10M, i.e., the inflation and deployment characteristics of the airbag 10, including the deployment characteristics in the left-right direction G, can be improved, whereby mainly the knees K of the occupant S can be reliably protected by allowing the airbag 10 to be quickly and reliably inserted in front of the knees K of the occupant S. At the same time, because the airbag 10 can be quickly and reliably deployed evenly on the left and right sides, it is possible to prevent the knees K of the occupant S from coming into contact with the airbag 10 and being spread apart during inflation and deployment, i.e., it is possible to prevent a force from acting in the directions spreading the knees K apart. Thus, the injury to the occupant S can be minimized.

Furthermore, in this airbag device 1, for example, even if the gas discharge port 2A is disposed at a position close to one end in the inflator 2, because of the above-described advantages of the diffuser 30 having the opening 31, it is possible to rectify the generated gas to the central portion of the airbag 10 in the left-right direction G and to supply the gas evenly on the left and right sides. Thus, no matter where the gas discharge port 2A is formed in the inflator 2, it is possible to supply the gas to the airbag 10 evenly on the left and right sides through the opening 31 of the diffuser 30. Therefore, it is possible to reduce left-right variations of the airbag 10 during the deployment due to unevenness of the gas and to allow the airbag 10 to inflate and deploy evenly on the left and right sides. This enables the center of the inflator 2 to be aligned with the center of the airbag 10, regardless of the position of the gas discharge port 2A, making it easy to dispose the inflator 2 in the airbag 10 or to assemble the inflator 2 to the airbag 10. As a result, decrease in working efficiency in the assembling can be prevented and the balance of the airbag 10 and the airbag device 1 in the left-right direction G can be improved.

Accordingly, in this embodiment, it is possible to deploy the airbag 10 evenly on the left and right sides and to improve the protection function for protecting the knees K of the occupant S, while preventing decrease in working efficiency in the assembling of the airbag device 1 and the balance thereof. Thus, the occupant S can be protected more safely. Furthermore, herein, as has been described above, the diffuser 30 and the inclined joined portions 34 thereof (see FIG. 2) can prevent the gas generated by the inflator 2 from being directly blown against the airbag 10, such as the base fabric sheets 11 and 12 and the first tether 24 and can prevent the gas discharge port 2A of the inflator 2 from directly coming into contact with the airbag 10. The diffuser 30 serving as the protection member can prevent the heat of the gas generated by the inflator 2 and the heat in the vicinity of the gas discharge port 2A from making a hole in the airbag 10 or the first tether 24, i.e., can protect the airbag 10 and reduce the damage thereto during inflation and deployment. Thus, the damage thereto can be prevented.

Herein, in this embodiment, the ends of the diffuser 30 in the left-right direction G are joined by the joined portions 33 and 34 extending in two directions, i.e., the joined portions 33 extending in the deploying direction F and the inclined joined portions 34. However, they may be joined either by only one of the joined portions 33 and 34 extending in one direction or by combining joined portions extending in three or more directions. Similarly, these joined portions may be formed so as to be curved toward the center of the airbag 10 with respect to the deploying direction F, for example. That is, they may be appropriately formed in accordance with the shape of the inflator 2, the position of the gas discharge port 2A, or the like.

At this time, if the ends of the diffuser 30 are joined only by the joined portions 33 extending linearly in the deploying direction F without providing the inclined joined portions 34, the gas discharge port 2A and the first tether 24 directly face each other without the diffuser 30 therebetween, depending on the type of the inflator 2. However, even in such a case, because the diffuser 30 prevents the gas from being directly blown against the base fabric sheets 11 and 12 or the gas discharge port 2A from coming into contact with the airbag 10, the airbag 10 can be sufficiently protected. At the same time, it is also possible to supply the gas from the inflator 2 to the airbag 10 substantially evenly on the left and right sides through the opening 31 of the diffuser 30 opened by the gas pressure.

Note that, as in the case of this airbag device 1, when the inclined joined portions 34 are provided on the opening 31 side of the diffuser 30 to dispose the portion of the diffuser 30 except for the opening 31 between the gas discharge port 2A of the inflator 2 and the first tether 24 opposed thereto, as described above, it is possible to block the gas flow discharged from the gas discharge port 2A and to prevent the gas from being directly blown against the first tether 24. Thus, the diffuser 30 can prevent the gas supplied from the inflator 2 from being directly blown against the first tether 24. As a result, it is possible to reliably protect the first tether 24 from the gas and to effectively reduce the damage thereto. At the same time, because the gas from the inflator 2 passing from the inside of the accommodating portion 32 through the opening 31 is rectified toward the first tether 24 and is supplied to the airbag 10 through these portions, it is possible to supply the gas to the airbag 10 evenly on the left and right sides.

Accordingly, it is preferable that the diffuser 30 and the opening 31 be formed such that the gas from the gas discharge port 2A is not directly blown against the first tether 24 by forming the inclined joined portions 34 at the ends in the left-right direction G. At this time, when the inclined joined portions 34 are formed, the inclined angle with respect to the deploying direction F (angle Y in FIG. 2) is set in accordance with the shape and size of the inflator 2, the size of the diffuser 30, and the like. More specifically, for example, when the inflator 2 having the gas discharge port 2A at one end is accommodated in the diffuser 30 having a common size, if the angle Y is smaller than 30°, the gas may be directly blown against the first tether 24. Thus, in this case, the angle Y is set to 30° or more. In order to more reliably prevent the gas from being directly blown against the first tether 24, the angle Y of the inclined joined portions 34 is set to about 45°.

Furthermore, as in the case of the airbag device 1 according to this embodiment, when the accommodating portion 32 of the diffuser 30 is formed so as to be gradually reduced in size toward the opening 31, the gas discharge direction from the inside of the diffuser 30 can be accurately oriented toward the first tether 24 to which the opening 31 is facing. This enables, for example, the gas to be reliably supplied toward the central portion of the first tether 24, i.e., enables the gas-rectifying effect of the diffuser 30 to be improved, to prevent the gas supplied to the airbag 10 from varying in the left-right direction G. Thus, the deployment characteristics of the airbag 10 can be further increased.

In addition, in this airbag device 1, the diffuser 30 is formed by joining the folded base fabric sheets together so as to leave the opening 31, as described above. Thus, the manufacturing thereof is easy. At the same time, depending on the shape and joining pattern of the folded base fabric sheets, the flow of the gas supplied thereto can be easily and variously set. Furthermore, because the tethers 24 and 25 in the airbag 10 are provided with the through-holes 24B and 25B, the gas from the inflator 2 can be circulated therethrough in the deploying direction F. As a result, even in an initial stage of the deployment, the airbag 10 can be deployed in the deploying direction F, whereby the deployment speed of the airbag 10 in the aforementioned direction is increased. Thus, the inflation and deployment of the airbag 10 can be more quickly and reliably completed.

Moreover, in this embodiment, the opening 31 of the diffuser 30 is disposed in the airbag 10 and is then closed simultaneously with the folding of the airbag 10. Therefore, there is no need to add the process and operation to close the opening 31, making the assembling of the diffuser 30 easy and making the operation thereof simple. In contrast, as described above, when the diffuser 30 is disposed in the airbag 10 after the opening 31 is closed, whether or not the opening 31 is closed can by confirmed and the opening 31 can be reliably closed.

Although the airbag 10 of the airbag device 1 is provided with two tethers 24 and 25 therein that define the air chambers 21, 22, and 23, the airbag 10 may be provided with at least one tether that faces the opening 31 of the diffuser 30 and defines the inside of the airbag 10 in the deploying direction F (herein, the first tether 24). Accordingly, as long as such a first tether 24 is provided, a plurality of other tethers may be provided in the airbag 10, and, for example, a plurality of strip-shaped tethers may be arranged in the left-right direction G or may be disposed at predetermined intervals. Alternatively, the base fabric sheets 11 and 12 may be joined together by sewing at the joined position of the second tether 25 to form a similar air chamber.

Furthermore, although this embodiment has been described taking the airbag 10 folded through three folding steps (see FIG. 3) as an example, the airbag 10 may be roll-folded only in the longitudinal direction or may be compressed and folded in an accordion shape from the leading end 10S toward the base end 10T (inflator 2), i.e., it may be folded in another shape capable of being inflated and deployed.

The invention claimed is:

1. A knee-protecting airbag device comprising: an airbag with a base end attached to and accommodated in a vehicle body in front of an occupant; and an inflator that supplies gas to the airbag from a gas discharge port, the knee-protecting airbag device inflating and deploying the airbag from the base end to a position between the vehicle body and knees of the occupant with the gas from the inflator,
   wherein the knee-protecting airbag device comprises: a diffuser accommodating the inflator and disposed in the airbag, the diffuser having an opening that allows the gas from the inflator to flow in the airbag; and at least one tether disposed in the airbag so as to face the opening of the diffuser, the tether defining the inside of the airbag in a deploying direction,
   wherein the opening of the diffuser is closed before the inflator is activated and is opened by the gas from the inflator when the airbag deploys, and
   wherein, during activation, the gas that is supplied by the inflator is maintained in an accommodating portion of the diffuser while the opening is closed and the entirety of the closed opening is substantially simultaneously opened at a predetermined pressure.

2. The knee-protecting airbag device according to claim 1, wherein the diffuser is disposed in the airbag such that a portion other than the opening is disposed between the gas discharge port of the inflator and the tether facing thereto.

3. The knee-protecting airbag device according to claim 1, wherein the diffuser is formed by joining folded base fabric sheets together so as to be capable of accommodating the inflator therebetween and so as to leave the opening.

4. The knee-protecting airbag device according to claim 1, wherein the at least one tether is provided with a through-hole that allows the gas from the inflator to circulate.

5. The knee-protecting airbag device according to claim 1, wherein the diffuser is formed such that the accommodating portion that accommodates the inflator is gradually reduced in size toward the opening, at least on the opening side.

6. The knee-protecting airbag device according to claim 1, wherein the diffuser accommodating the inflator, whose opening is closed, is disposed in the airbag.

7. The knee-protecting airbag device according to claim 1, wherein the diffuser accommodating the inflator, whose opening not closed, is disposed in the airbag, and the opening is closed when the airbag is folded.

8. The knee-protecting airbag device according to claim 1, wherein the opening is closed by folding the entirety of the vicinity of the opening of the diffuser at least once toward the inflator.

9. The knee-protecting airbag device according to claim 1, wherein the opening is closed by joining the opening with an adhesive.

10. The knee-protecting airbag device according to claim 1, wherein the opening is closed by sewing the opening.

* * * * *